United States Patent Office 3,748,096
Patented July 24, 1973

3,748,096
INDICATOR FOR THE DETECTION OF
COPPER IONS
Dieter Schmitt, Alfred Stein, and Wilhelm Bäumer, Darmstadt, Germany, assignors to Merck Patent Gesellschaft mit beschränkter Haftung, Darmstadt, Germany
No Drawing. Filed Mar. 9, 1971, Ser. No. 122,543
Claims priority, application Germany, Aug. 7, 1970,
P 20 39 242.1
Int. Cl. G01n 31/22
U.S. Cl. 23—230 R                                   16 Claims

ABSTRACT OF THE DISCLOSURE

An indicator for the colorimetric detection of copper ions is formed by impregnating an absorbent carrier with a composition comprising complexing agents for $Cu^+$ ions, hydroxylammonium chloride and ascorbic acid as reducing agents, buffer substances and emulsifiers and/or wetting agents containing polyalkylene oxide groups.

BACKGROUND OF THE INVENTION

This invention relates to an indicator and process for the colorimetric determination of copper ions and methods for the production thereof.

In analytical chemistry, the use of identification reagents for the colorimetric determination of certain metal ions has become increasingly important. Test papers for the detection of copper ions are well known. These test papers are usually impregnated with an organic complexing agent, resulting in the formation of a specific color with the copper(I) ions present in the solution being tested. However, there are several drawbacks in the use of these conventional indicators. First, a relatively long period of time, e.g., several minutes, is required before maximum color depth is reached. Consequently, it is not possible to perform a semiquantitative determination with such indicator papers such as that discussed above, because, after immersing the test paper into the solution to be tested, the color produced on the indicator paper does not remain constant and thus cannot readily be compared with a standard color scale. In addition, as the testing solution penetrates the paper, a concentration gradient is produced, thereby making a semiquantitative determination of the copper ions present impossible. Another important drawback is that the color produced in the presence of copper ions is directly influenced by the pH of the solution being tested. Consequently, the field of application of this conventional indicator is very limited.

In the conventional analytic determination of $Cu^+$, the colored complex formed with a complexing agent for $Cu^+$ is extracted from the aqueous solution with an organic solvent and thereafter subjected to photometry. A purple color is obtained, the shade varying according to the concentration of $Cu^+$ present in the solution.

Since the above-mentioned $Cu^+$ organic complexing agents can only detect $Cu^+$, it is necessary to reduce any $Cu^{++}$ ions present in the solution to $Cu^+$. The reducing agent most frequently employed hitherto is hydroxylammonium chloride.

There thus remains a need for an indicator composition and a process for effectively and efficiently performing both qualitative and quantitative tests on a copper containing solution which can be carried out in a very short period of time and which do not exhibit the afore-mentioned disadvantages of conventional indicators.

OBJECTS OF THE INVENTION

It is an object of this invention to provide a novel indicator for the detection of copper ($Cu^+$) ions. It is another object to provide novel compositions for the semiquantitative determination of copper ions. Another object is to provide an indicator which is suitable for performing both quantitative and qualitative tests which are not affected by the pH of the solution to be tested. A further object of the invention is the use of an indicator which changes to a specific color and remains at that color for a long period of time, thus permitting a comparison with a color scale in order to readily determine the amount of copper ions present in the solution being tested. A still further object is the provision of an indicator which produces a constant color in a very short period of time. Other objects will be apparent to those skilled in the art to which this invention pertains.

SUMMARY OF THE INVENTION

The indicators of this invention comprise:

(a) a complexing agent for $Cu^+$ which forms a colored complex;
(b) hydroxylammonium chloride and ascorbic acid;
(c) a buffer agent; and
(d) a surfactant.

DETAILED DISCUSSION

According to one embodiment of this invention, an absorbent carrier is impregnated with an indicating composition of this invention, which ensures identical readings of the copper ions present in a test solution because identical colorings of the indicator are obtained independent of the pH of the solutions being examined. Furthermore, the maximum color depth is produced within a very short period of time and remains constant for a long period, so that a comparison with a color scale can be easily carried out. Thus, it is possible to conduct semiquantitative tests to determine the amount of copper ions present in a particular solution. In addition, a linear correlation between the copper ion concentration of the test solution and the resultant color depth is unexpectedly obtained with the novel indicator compositions of this invention.

Complexing agents for $Cu^+$ which form colored complexes are well known. The ones most frequently used are, for example, cuproine (2,2'-diquinoline), neocuproine (2,9-dimethyl-1,10-phenanthroline), bathocuproine (2,9-dimethyl-4,7-diphenyl-1,10-phenanthroline), and the disodium salt of bathocuproine-disulfonic acid (2,9-dimethyl-4,7-bis[3-phenylsulfonic acid]-1,10-phenanthroline). Cuproine is the preferred complexing agent. These complexing agents can also be employed in the form of an acid addition salt thereof, e.g., the hydrochloride.

The complexing agents are present in an amount sufficient to ensure conversion of all $Cu^+$ ions present in the test solution to a colored complex. The exact amount required will, of course, depend upon the volume of test liquid applied to the reagent composition and the $Cu^+$ concentration thereof. When the reagent composition is absorbed on an absorbent carrier, a concentration of about 0.05 to 0.7%, preferably about 0.2 to 0.6%, in the solution thereof applied to the absorbent carrier will suffice to complex the $Cu^+$ ions in test solutions which would normally thereafter be applied to the absorbent carrier impregnated with the reagent composition.

As stated above, in order to obtain a semi-quantitative determination of all the copper ions in the test solution, any $Cu^{++}$ ions therein must be reduced to $Cu^+$ ions which are then complexed with the $Cu^+$ complexing agent in the reagent composition. Hydroxylammonium chloride is the conventional reducing agent employed for this purpose.

It has been found that especially good results are obtained for copper ions when the reducing agent comprises ascorbic acid. Thus, in the novel indicator composition of this invention a mixture of hydroxylammonium chloride ascorbic acid is employed.

As with the $Cu^+$ complexing agent, in order to obtain a semi-quantitative result, the amount of reducing agent which should be present in the reagent composition should be sufficient to reduce all of the $Cu^{++}$ ions present in any test solution. The exact amount will depend on the volume and $Cu^{++}$ content of the test solutions contacted with the reagent. When the reagent composition is absorbed on an absorbent carrier, to ensure complete reduction of the $Cu^{++}$ ions of any test solution which would normally be applied thereto, the impregnating composition for the absorbent carrier should contain 0 to 20%, preferably 0-10%, of hydroxylammonium chloride and 0 to 10%, preferably 0.1-5%, of ascorbic acid. The reduction of any $Cu^{++}$ ions to $Cu^+$ ions and the colored complex formation take place within a few seconds.

The composition of this invention also comprises a buffer agent. A buffer is employed which will ensure that the complexing of $Cu^+$ ions occurs at a mildly acidic to nearly neutral pH, e.g., from 1 to 7, the optimum pH range being about 2 to 3, preferably 2.2 to 2.8. When the pH range of the test solution is from 1 to 7, the accuracy of the reagent composition is independent of the pH of the solution to be tested. Suitable buffers include conventional buffer agents. These agents are advantageously employed in forming the novel reagent composition at a concentration of at least 0.01 M or 1 to 10% of the composition. Conventional buffers which can be employed include, for example, weak organic acids, e.g., tartaric acid, citric acid, malic acid, malonic acid, succinic acid, maleic acid, and the alkali salts thereof; inorganic weak acids, e.g., phosphoric acid and boric acid, and the alkali salts thereof. It is also possible to prepare any desired mixture of such buffer agents. The desired pH is normally adjusted by adding an aqueous alkali hydroxide solution, preferably NaOH, to the impregnating solution.

It is preferable to additionally buffer very strongly acidic test solutions, i.e., having a pH of below 1, with sodium acetate. As would be apparent, because at pH values above 6 $Cu^{++}$ is not present in ionic form to any great extent, copper ions in the $Cu^{++}$ state cannot be detected at a pH above 6 by this method.

The compositions of this invention also contain a surfactant, i.e., a wetting agent and/or an emulsifier. Preferred surfactants are those generally employed for the preparation of oil-in-water emulsions. Preferred are those which contain polyalkylene oxide groups, preferably polyethylene oxide and/or polypropylene oxide groups. In one group of compounds, the wetting agent properties are predominant, whereas, in other compounds, the emulsifying properties predominate. Nonionic emulsifiers and/or wetting agents are preferred, but anionic surfactants are also suitable for the present invention. The exact nature of these substances is not critical and the selection of one which does not interfere with the main reaction can readily be accomplished from published information.

It has been found that a great variety of emulsifiers and/or wetting agents containing polyalkylene oxide units yield the desired result. Examples of suitable emulsifiers and/or wetting agents which can be employed include: ethylene oxide derivatives of fatty alcohols; polypropylene glycol-ethylene oxide addition products; polyglycol ethers, e.g., alkylaryl polyglycol ethers, including nonylphenol polyglycol ethers and tributylphenol polyglycol ethers; and polyoxyethylenephosphoric acid esters, a group of liquid anionic surface-active substances.

Suitable absorbent carriers include those which are normally used in combination with identification reagents. Filter paper is preferred. It is also possible to employ other forms of absorbent cellulose and cellulose derivatives and adsorbent plastic products, e.g., sheets of polyester fiber and fiberglass laminate.

The amount of emulsifier and/or wetting agent to be added to the impregnating composition ranges between about 0.5 and 10 g./100 ml. and preferably between 3 and 7 g./100 ml. of impregnating composition. Larger quantities can also be employed since the desired results are not impaired.

According to a preferred embodiment of the invention, the absorbent carrier is impregnated successively with at least two different solutions, each of which contain only a portion of the components (a)–(d), preferably in different solvents. Thus, for example, one of the impregnating solutions can contain components (b) and (c) and the other can contain the components (a) and (d). However, it is also possible for the component (d) to be entirely or partially contained in the solution which also contains components (b) and (c). When the impregnation is conducted with separate solvent solutions, it is, of course, necessary to dry the absorbent carrier between the impregnating steps. Thus, for example, where the complexing agents to be employed are only soluble in organic solvents, the components (b) and (c) can separately be applied in the form of an aqueous solution. Component (d) can be contained in aqueous and/or organic solvents.

Suitable organic solvents include volatile solvents which readily evaporate and dissolve the conventional complexing agents. Suitable solvents include, e.g., benzene, toluene, methanol, ethanol, isopropanol, or mixtures thereof.

In order to prepare the aqueous impregnating solution, the following ingredients are dissolved, for example, in 100 ml. of water:

Impregnating Solution I

| | G. |
|---|---|
| Hydroxylammonium chloride | 0–10 |
| Ascorbic acid | 0.1–5 |
| Weak organic acid, e.g., tartaric acid and/or citric acid and/or | 2–10 |
| Weak inorganic acid, e.g., boric acid or phosphoric acid | 2–5 |
| An alkali salt of these inorganic acids and several ml. (about 1–10 ml.) of a 1–2 N NaOH or KOH, which provides a pH to the solution of about 2–3 | 0.5–4 |

Impregnating Solution II is an organic solvent solution containing about 0.05–0.7 g./100 ml. of a conventional organic complexing agent for $Cu^+$, for example, cuproine, neocuproine or bathocuproine, or the sodium salts thereof. 0.5–10 g. of an emulsifier and/or wetting agent is added either to the organic impregnating solution and/or to the above-described aqueous impregnating Solution I. A preferred organic solvent is methanol.

The absorbent carriers, preferably filter paper, are successively impregnated with the impregnating solution or solutions in a conventional manner so as to provide a pickup of the solution of about 5–85%, preferably about 17–65%, calculated on the dry weight of the carrier. The impregnated papers can either be cut into handy strips, or they can be processed into preferably square pieces. They can then be conventionally glued onto plastic films, paper strips, or metallic strips, or sealed onto or into such films and strips.

The indicators of this invention, as they are used for the colorimetric determination of copper ions, comprise an absorbent carrier uniformly impregnated (per m.² of surface area) with:

(a) 0.1–1.4 g., preferably 0.4–1.2 g., of a complexing agent for $Cu^+$ ions as defined herein;

(b) 0.3–42 g., preferably 3–30 g., of a reducing agent comprising hydroxylammonium chloride and ascorbic acid;

(c) 5.6–28 g., preferably 10–20 g., of an acidic buffer, i.e., which buffers an aqueous solution applied to the composition at an acidic pH, preferably at about pH 2–3; and (d) 1–28 g., preferably 5–20 g., of a surfactant.

In order to detect the presence of copper ions in a test solution, these test strips are dipped into the solution to be examined until the testing zone is completely wetted and then removed. In the presence of copper ions, the testing zone is colored purple. The shade of purple is compared with a standard color scale after about 10–15 seconds to determine the copper ion concentration of the solution.

In this semiquantitative detection method, marked differences in the shade of the purple color can be observed between test solutions containing 5, 10, 25, 50, 100, 200, and 500 mg./l. (or p.p.m.) copper ions.

The novel indicator compositions are characterized by a very high selectivity and sensitivity. With them, it is possible to detect, with accuracy, 5 mg./l. of copper ions. When the solution to be tested contains more than 1000 mg./l. of copper ions, the color of the testing zone produced after immersion in the test solution changes from purple to brownish olive green. In this case, an aliquot of the solution should be diluted to a concentration such that a purple color lying within the color scale is obtained. By multiplying in accordance with the selected dilution, a semiquantitative indication of the copper ion concentration can thus be obtained.

The novel indicator compositions of this invention are very specific to $Cu^+$ ions. The influence of other cations on the test is extremely minor. Thus, the indication procedure of this invention is not impaired by the presence of less than 1000 mg./l. of the following ions, respectively: $Ag^+$, $Al^{3+}$, $As^{3+}$, $Au^{3+}$, $Ba^{2+}$, $Be^{2+}$, $Bi^{3+}$, $Ca^{2+}$, $Ce^{4+}$, $Cd^{2+}$, $Co^{2+}$, $Cr^{3+}$, $Fe^{2+}$, $Fe^{3+}$, $Hg^+$, $Hg^{2+}$, $K^+$, $Li^+$, $Mg^{2+}$, $Mn^{2+}$, $NH_4^+$, $Na^+$, $Ni^{2+}$, $Pb^{2+}$, $Rb^+$, $Sb^{3+}$, $Sn^{2+}$, $Sr^{2+}$, $Ti^{4+}$, $Tl^+$, $VO^{2+}$, $Zn^{2+}$, $Zr^{4+}$.

Molybdenum blue ($MoO_2 \cdot 4MoO_3 \cdot H_2O$) interferes with the test because of its inherent blue color. Therefore, this color should be eliminated by the addition of, for example, potassium permanganate crystals until a permanent dark red coloring of the solution results. Thereafter, decolorization should be effected with hydroxylammonium chloride, so that the copper ion concentration can then be determined by means of the indicator of this invention.

The novel indicator also exhibits low sensitivity towards anions. Only $CN^-$, $[Fe(CN)_6]^{3-}$, and $[Fe(CN)_6]^{4-}$ withdraw copper ions from the indicating reaction due to complex formation.

The detection process is not adversely affected by less than 1000 mg./l. respectively of: $Br^-$, $BrO_3^-$, $Cl^-$, $ClO_3^-$, $ClO_4^-$, $F^-$, $MnO_4^-$, $Mo_7O_{24}^{6-}$, $N_3^-$, $NO_2^-$, $NO_3^-$, $OCN^-$, $PO_4^{3-}$, $SCN^-$, $SeO_3^{2-}$, $SO_3^{2-}$, $SO_4^{2-}$, $S_2O_5^{2-}$, $S_2O_8^{2-}$, $VO_3^-$, $WO_4^{2-}$, acetate, ascorbate, citrate, oxalate, succinate, tartrate.

In the presence of more than 500 mg./l. of $CrO_4^{2-}$, $IO_4^-$, $S_2O_3^{2-}$, and more than 250 mg./l. of $I^-$, lower copper ion concentrations are detected than actually are present. More than 500 mg./l. of $IO_3^-$ and $IO_4^-$ color the indicator paper brown to greenish black.

The novel indicator thus exhibits considerable advantages over the previously known identification reactions for copper ions. According to the foregoing, it is possible to conduct semiquantitative determinations at a very high level of selectivity and, unexpectedly, the accuracy of detection is independent of the pH of the solution to be examined over a very wide pH range. Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Example 1

Filter paper (No. 2316 of the firm Schleicher und Schüll) is impregnated with Solution I below (17% by weight pick-up), dried, impregnated with Solution II below, and then dried again. The thus-obtained impregnated filter paper is cut into small squares of about 5 x 5 mm. and glued to plastic strips of 6 x 60 mm. at the lower end thereof.

Solution I comprises:
 2.0 g. hydroxylammonium chloride
 0.4 g. ascorbic acid
 4 g. tartaric acid
 0.8 g. sodium citrate
 100 ml. water
 a few ml. 2 N NaOH to a pH of 2.6.

Solution II comprises:
 0.25 g. 2,2'-diquinoline
 5 g. nonylphenol polyglycol ether (M.W. 600)
 100 ml. methanol/10 N HCl (100:0.3).

The test stick, after being dipped into a solution containing, in addition to nickel and cobalt ions, 10 mg./l. of $Cu^+$ and 10 mg./l. of $Cu^{++}$, exhibits a purple color, the shade of which corresponds with a standard color scale, to a value of 20 mg./l. of $Cu^+$.

Example 2

The emulsifier of impregnating Solution II set forth in Example 1 is replaced by 5 g. of one of the following surfactants:

(a) fatty alcohol polyglycol ether;
(b) polypropylene glycol-ethylene oxide addition product;
(c) alkylaryl polyglycol ether;
(d) tributylphenol polyglycol ether;
(e) polyoxyethylenephosphoric acid ester.

The resulting modified Solutions II are applied to respective sheets of filter paper impregnated with Solution I in the manner described in Example 1 and dried. Each of the resulting test papers indicate the same copper ion content when used with the test solution of Example 1 as the test paper of Example 1.

Example 3

Impregnating solutions are prepared analogously to Example 1, except reducing agent is modified in impregnating Solution I. The following mixtures of hydroxylammonium chloride and ascorbic acid were employed as reducing agent: 0, 0.5, 1, 2, 3, 5 and 10 g. of hydroxylammonium chloride are each mixed with 0.2; 0.5; 2 and 5 g. of ascorbic acid, respectively.

Each of the indicators produced with these various impregnating Solutions I indicates, after immersion into the test solution described in Example 1, a copper ion content of 20 mg./l.

Example 4

Impregnating solutions are prepared analogously to Example 1, except that the sodium citrate of Solution I is replaced with 0.8 g. of sodium succinate, sodium malonate, sodium maleinate, sodium borate, and sodium phosphate, respectively.

The test sticks produced in the same manner as Example 1, after being immersed into a solution containing, in addition to 20 mg./l. of $Cu^+$ and 10 mg./l. of $Cu^{++}$, manganese and zinc ions, show a marked change in color, corresponding in accordance with a standard color scale to a copper ion content of 30 mg./l.

Example 5

Modifications of the impregnating Solution I of Example 1 are prepared by replacing the tartaric acid and sodium citrate thereof by mixtures of 4 g. of malic acid, succinic acid, boric acid, citric acid, maleic acid, malonic acid, and 1 g. of the corresponding sodium salts, respectively. Each give a color indicating 30 mg./l. of copper ions with the test solution of Example 4.

Example 6

In impregnating Solutions II otherwise corresponding to Example 1, the diquinoline is employed in amounts of 0.4 g. and 0.7 g., respectively. The same copper detection procedures can be conducted with these indicators as with the indicator prepared with the impregnating solutions according to Example 1.

Example 7

In impregnating Solutions II according to Example 1, the methanol is replaced by the following solvents:

(a) benzene;
(b) toluene;
(c) benzene/ethanol, 1:1;
(d) toluene/isopropanol, 2:1; and
(e) toluene/isopropanol, 1:1.

Indicators prepared wtih these impregnating solutions likewise provide reagents for accurate semi-quantitative determinations of copper ions.

Example 8

In the impregnating solutions of Example 1, the emulsifier of Solution II is added to Solution I.

These indicators thus produced likewise provide accurate reagents for semi-quantitative copper determinations.

Example 9

In impregnating Solution II according to Example 7, 2,2-'diquinoline is replaced by 2,9-dimethyl-1,10-phenanthroline. The indicator thus produced is an accurate reagent for semi-quantitative copper determinations.

Example 10

In the impregnating Solution II according to Example 7, 2,2'-diquinoline is replaced by 2,9-dimethyl-4,7-diphenyl-1,10-phenanthroline.

Also with this indicator, perfect semi-quantitative copper determinations can be conducted.

Example 11

0.2 g. of 2,9-dimethyl-4,7-bis-(3-phenylsulfonic acid)-1,10-phenanthroline and 2 g. of nonylphenol polyglycol ether are added to the impregnating Solution I of Example 1. Solution II is omitted. This indicator also is an accurate reagent for semi-quantitative copper determinations.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A colorimetric indicator suitable for the rapid semi-quantitative detection of copper ions in solution which is substantially pH independent at pH 1–7, said indicator comprising an absorbent carrier impregnated with:

(a) a complexing agent for $Cu^+$ ions which forms a colored complex in the presence of $Cu^+$ ions, said complexing agent being present in an amount sufficient to ensure the conversion of all $Cu^+$ ions in a test solution to a colored complex;
(b) a reducing agent consisting essentially of both hydroxylammonium chloride and ascorbic acid in an amount sufficient to reduce $Cu^{++}$ ions present in a test solution to $Cu^+$ ions;
(c) an acidic buffer in an amount sufficient to maintain a pH of 1–7 during the complexing of $Cu^+$ ions; and
(d) a nonionic or anionic surfactant.

2. An indicator according to claim 1 wherein the surfactant is a nonionic surfactant containing polyalkyleneoxide units.

3. An indicator according to claim 1 wherein the $Cu^+$ complexing agent is 2,2'-diquinoline.

4. An indicator according to claim 1 wherein the carrier is paper.

5. An indicator according to claim 1 wherein the surfactant is a nonionic surfactant containing polyethylene oxide and/or polypropylene oxide groups.

6. An indicator according to claim 1 wherein the carrier is paper and the surfactant is a polyalkyleneoxide nonionic surfactant.

7. An indicator according to claim 1 wherein said carrier is uniformly impregnated with:
(a) 0.1–1.4 gm./m.$^2$ of surface area of said complexing agent;
(b) 0.3–42 gm./m.$^2$ of surface area of said reducing agent;
(c) 5.6–28 gm./m.$^2$ of surface area of said acidic buffer; and
(d) 1–28 gm./m.$^2$ of surface area of said surfactant.

8. An indicator according to claim 1 wherein said carrier is uniformly impregnated with:
(a) 0.4–1.2 gm./m.$^2$ of surface area of said complexing agent;
(b) 3–30 gm./m.$^2$ of surface area of said reducing agent;
(c) 10–20 gm./m.$^2$ of surface area of said acidic buffer; and
(d) 5–20 gm./m.$^2$ of surface area of said surfactant.

9. An indicator according to claim 1 wherein said buffer maintains a pH of 2–3 during the complexing of $Cu^+$ ions.

10. An indicator according to claim 1 wherein said complexing agent is selected from the group consisting of 2,2'-diquinoline; 2,9-dimethyl-1,10-phenanthroline; 2,9-dimethyl-4,7-diphenyl-1,10-phenanthroline; the disodium salt of 2,9-dimethyl-4,7-bis[3-phenylsulfonic acid]-1,10-phenanthroline, or an acid addition salt thereof.

11. A process for the colorimetric determination of $Cu^+$ ions in aqueous solutions which comprises moistening an indicator of claim 1 with the aqueous solution to be tested.

12. A method for preparing an indicator for the colorimetric detection of $Cu^+$ which comprises impregnating an absorbent carrier with one or more solutions of:
(a) a complexing agent for $Cu^+$ ions which forms a colored complex in the presence of $Cu^+$ ions;
(b) a reducing agent comprising hydroxylammonium chloride and ascorbic acid;
(c) an acidic buffer; and
(d) a surfactant.

13. A method according to claim 12 which comprises the steps of applying to the absorbent carrier a solution of a portion of the impregnating materials (a), (b), (c) and (d); drying the carrier; applying a solution of the remainder of the impregnating materials; and again drying the carrier.

14. A method according to claim 13 wherein one of said impregnating solutions is a solution of the complexing agent for $Cu^+$ ions in an organic solvent.

15. A method according to claim 13 wherein one of said impregnating solutions contains 0–10% of hydroxylammonium chloride and 0.1–5.0% of ascorbic acid.

16. A method according to claim 13 wherein one of the impregnating solutions comprises (b) and (c) as an aqueous solution and the other impregnating solution comprises (a) as an organic solvent solution; and component (d) is present in one or both solutions.

References Cited
UNITED STATES PATENTS
3,359,072  12/1967  Rey et al. _____ 23—230 B

OTHER REFERENCES
Cheng, K. L., et al., Analytical Chemistry, vol. 25, pp. 655–9 (1953).

Hackh's Chemical Dictionary, 4th edition, p. 63 (1969).

Zak, B., et al., Analytical Chemistry, vol. 28, pp. 1158–61 (1956).

MORRIS O. WOLK, Primary Examiner

R. M. REESE, Assistant Examiner

U.S. Cl. X.R.

23—253 TP; 252—408